No. 763,859. PATENTED JUNE 28, 1904.
J. D. DARLING.
PROCESS OF SEPARATING CARBON FROM PULVERIZED CARBONACEOUS MATERIALS.
APPLICATION FILED APR. 28, 1904.
NO MODEL.
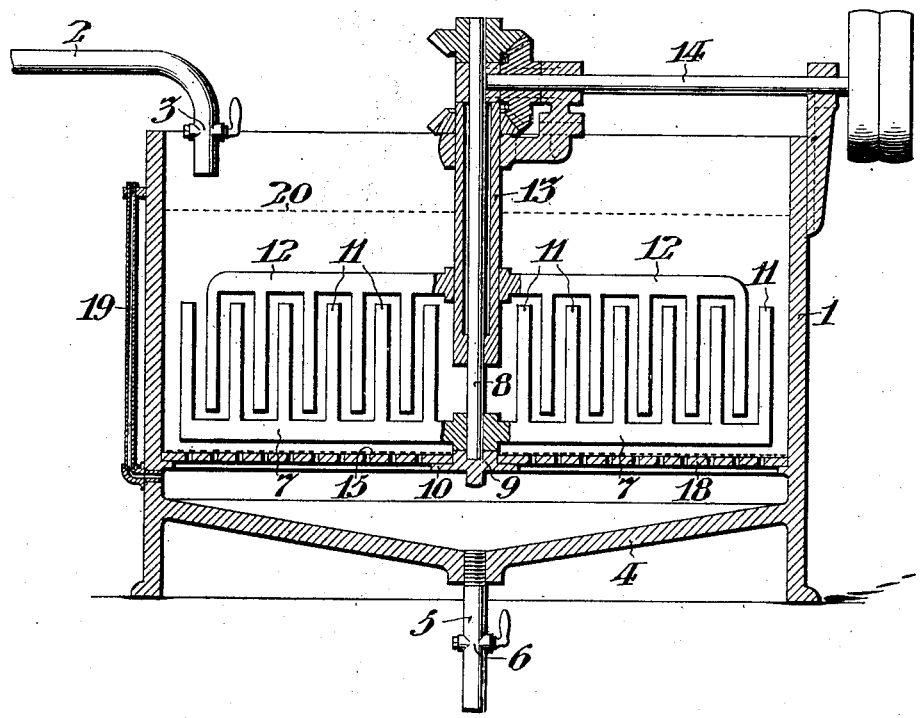
WITNESSES:
Clifton C Hallowell
John C Bergner
INVENTOR:
JAMES D. DARLING
by his attorneys
Paige Paul + Foley No. 763,859.

Patented June 28, 1904.

UNITED STATES PATENT OFFICE.

JAMES D. DARLING, OF PHILADELPHIA, PENNSYLVANIA.

PROCESS OF SEPARATING CARBON FROM PULVERIZED CARBONACEOUS MATERIALS.

SPECIFICATION forming part of Letters Patent No. 763,859, dated June 28, 1904.

Application filed April 28, 1904. Serial No. 205,342. (No specimens.)

*To all whom it may concern:*

Be it known that I, JAMES D. DARLING, of No. 4826 Greenway avenue, in the city of Philadelphia, county of Philadelphia, State of Pennsylvania, have invented a certain new and useful Process of Separating Carbon from Pulverized Carbonaceous Materials, of which the following is a specification, reference being had to the accompanying drawing.

When oil is mixed with pulverized carbonaceous materials, the oil and carbon tend to form a buttery and homogeneous mass, with which the earthy or other materials occurring in the mixture do not associate. I have discovered that this mass of oil and carbon is not washed through a foraminate partition by a current of water passing through the mass and the partition, although the current will carry through the partition all the other materials. This is not a simple screening process by which a coarser material is separated from a finer one, but is dependent upon the aversion which a mixture of oil and carbon has to pass through a foraminate partition, the fineness of which would not obstruct the passage of the pulverized carbon by itself.

A useful application of my invention is to separate graphite from its pulverized ores, and I will here describe my process as thus applied, it being understood that my invention is not thus limited, but applies as well to other carbonaceous mixtures.

Graphitic ore contains in addition, to the pure graphite, a considerable percentage of other minerals, usually quartz, silicates, and iron oxids.

According to my invention I pulverize graphitic ore and mix it with enough crude petroleum to thoroughly moisten it. The mixture is then introduced into an apparatus which comprises a receptacle, means for regulating the inflow and outflow of water, an agitating device by means of which the aqueous suspension of the mass to be operated upon may be effected, and a screen upon that side of the receptacle, preferably the bottom, toward which the flow of the water takes place, whereby the mass of mingled carbon and oil is prevented from being carried along with the current of water, while all other materials are washed free from this mass by the current of water passing through it and are thence carried by the current through the screen, and thus separated from the oil and carbon.

In the accompanying drawing I have illustrated in central vertical section an apparatus which I have found suitable for the practice of my process.

1 is the receptacle, provided with a water-supply pipe 2, admitting water near the top of the receptacle, subject to control by a valve 3. The bottom 4 of the receptacle is dished or funnel shaped and provided with an exit-pipe 5, subject to control by a valve 6. Within the receptacle there is mounted an agitator consisting of horizontal arms 7, carried by a vertical shaft 8, the lower end of which is supported by a thrust-bearing 9, mounted centrally in the receptacle upon a cross-piece 10. The arms 7 have upwardly-extending teeth 11. Other horizontal arms 12, with downwardly-extending teeth, are mounted on the sleeve 13. The shaft 8 and the sleeve 13 are rotated in opposite directions by bevel-gearing driven by the shaft 14. A fine wire screen 15—say about seventy mesh—is stretched across the receptacle below the stirrer. It is preferably strengthened and sustained by a coarser grating 18, which in turn may rest upon the cross-arm 10. The gage-tube 19 connects with the receptacle below the screen and indicates the pressure of the water below the screen.

When the pulverized graphitic ore mingled with oil is introduced into the receptacle, the water is allowed to flow in at a rate regulated by the valve 3. The agitator is set in motion and the entire mass stirred up and maintained in suspension in the water. The outflow is so regulated by the valve 6 as to maintain the receptacle full of water both above and below the screen. The oil and graphite form a homogeneous mass which does not pass down with the current through the screen. On the other hand, the rocky gangue frees itself from this mass and is constantly washed by the current of water out of the mass and through the screen. When the process has proceeded sufficiently, there remains in the receptacle above the screen only a mass of pure graphite mingled with oil, which is then taken from the apparatus and the oil separated from the graphite by expressing it (either by direct pressure or by means of a centrifugal machine) or by volatilization.

I have instanced the use of my process and apparatus for treating pulverized graphitic ore. In addition to the ore from the mines it is equally applicable to the refuse material and tailings, which are common in the neighborhood of graphite mines. From this material by the use of my process all of the graphite may readily be obtained in a perfectly-pure state.

For certain of its uses graphite must first be mixed with oil—as, for example, when it is to be used for lubricating purposes or for paints. Under these circumstances I employ in practicing my process the oil which would otherwise be subsequently mixed with the graphite and in this way produce directly the desired commercial product.

Thus far I have described only the application of my invention to graphitic material. I have found that other carbonaceous materials are capable of the same method of treatment. Thus if finely-powdered coal, coke, or charcoal is similarly treated a similar result follows. All these substances contain a considerable percentage of foreign mineral matters, usually chiefly silica. By my process all of these impurities may be removed and a perfectly-pure powdered carbon produced.

For the best results the quantity of oil mingled with the pulverized material should not be excessive. Usually it is sufficient if it assumes the consistency of damp sand. As the washing of the mixture proceeds, the constant diminution of the solid matter renders the mass more buttery. With a mixture having a comparatively small percentage of carbon this may leave at the end of the washing process a mixture of oil and carbon so thin as to be capable of passing to some extent through the screen. Therefore the poorer the mixture treated the less oil should be employed.

Having thus described my invention, I claim—

1. The process of separating carbon from pulverized carbonaceous material, which consists in mixing oil with said material; and flowing water through the mixture and through an obstruction impervious to the commingled oil and carbon but pervious to the water and gangue.

2. The process of separating carbon from pulverized carbonaceous material, which consists in mixing oil and water with said material; and agitating the mixture in juxtaposition to an obstruction impervious to the commingled oil and carbon but pervious to the water and gangue; with maintenance of a current of water from the region of the mixture to and through the obstruction.

3. The process of separating carbon from pulverized carbonaceous material, which consists in mixing oil with said material; agitating the mixture in juxtaposition to a foraminate partition in a body of water; with maintenance of a current of water through the mixture and through the partition.

4. The process of separating carbon from pulverized carbonaceous material, which consists in mixing oil with said material; agitating the mixture under water and over a foraminate partition; maintaining a downward current of water through the mixture and through the partition; removing the residuum resting on the partition; and recovering the carbon therefrom.

5. The process of separating carbon from pulverized carbonaceous material, which consists in mixing oil with said material; agitating the mixture under a body of water which is divided horizontally by an obstruction upon which the mixture rests, said obstruction being impervious to the commingled oil and material, but pervious to the water and gangue; maintaining a downward current of water through the mixture and through the obstruction by constant inflow of water above the obstruction, and a like constant outflow of water below the obstruction.

6. The process of separating graphite from its pulverized ore, which consists in mixing oil with the ore; agitating the mixture under water and over a foraminate partition; removing the residuum resting on the partition; and recovering the graphite therefrom.

7. The process of separating graphite from its pulverized ore, which consists in mixing oil with the ore; agitating the mixture under water and in juxtaposition to a foraminate partition; flowing water through the mixture to and through the partition; removing the residuum; and recovering the graphite therefrom.

8. The process of obtaining a pure mixture of oil and finely-divided carbon, which consists in mingling oil with pulverized carbonaceous material; placing the mixture upon a foraminate partition; and washing with a current of water constantly flowing down through the mixture and through the partition, until all of the non-graphitic solid ingredients are removed.

9. The process of obtaining a mixture of oil and pure graphite which consists in pulverizing graphitic ore; mingling oil with it; agitating the mixture in a body of water in juxtaposition to an obstruction impervious to the commingled oil and graphite, but pervious to the water and gangue; and constantly flowing water through the mixture and through the obstruction.

10. The process of obtaining a mixture of oil and carbon which consists in pulverizing carbonaceous material; mingling oil with it; placing it upon a screen with a body of water both above and below the screen; and maintaining a current of water downward through the mixture and through the screen.

In testimony whereof I have hereunto signed my name, at Philadelphia, Pennsylvania, this 25th day of April, 1904.

JAMES D. DARLING.

Witnesses:
JAMES H. BELL,
E. L. FULLERTON